Patented Oct. 14, 1924.

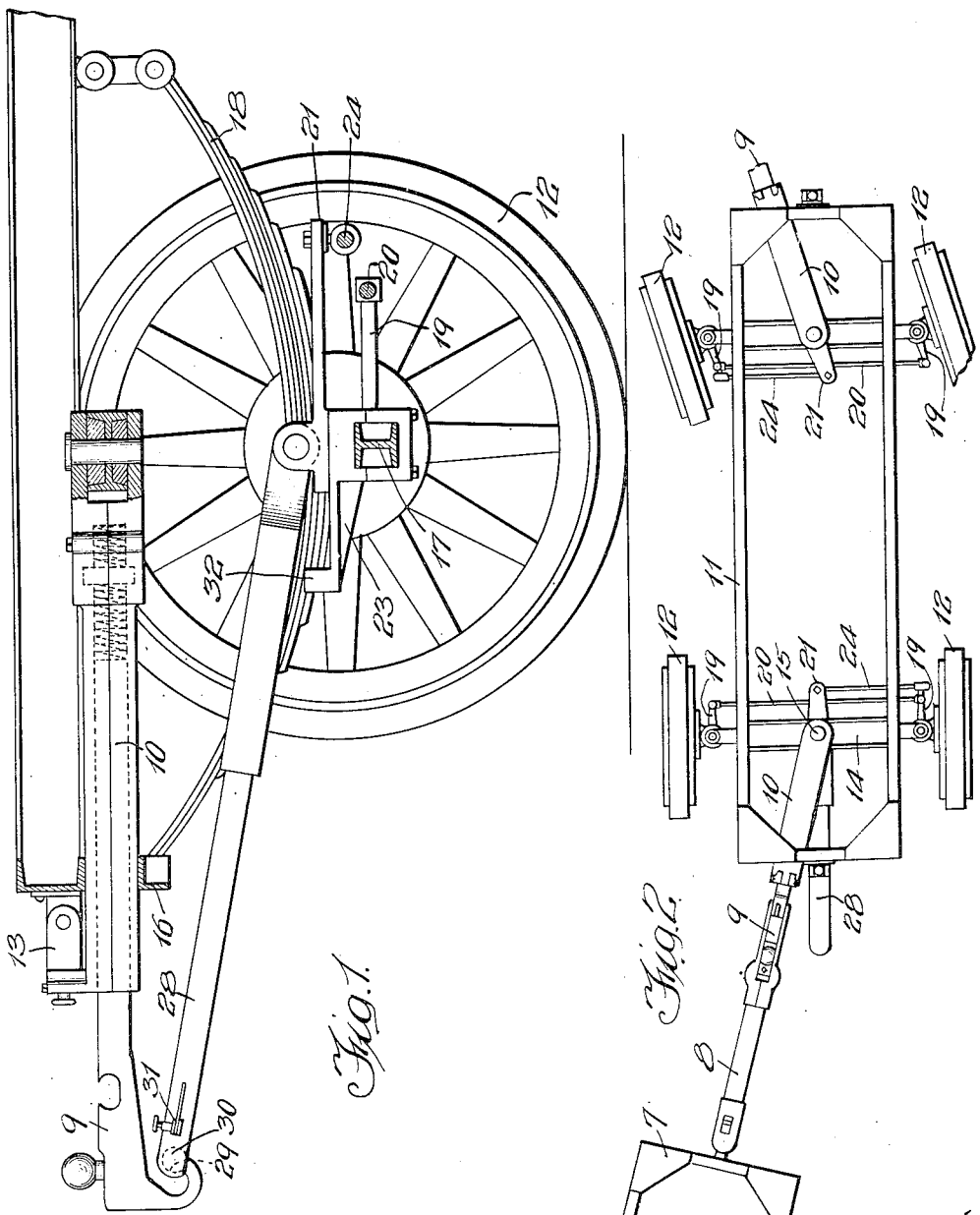

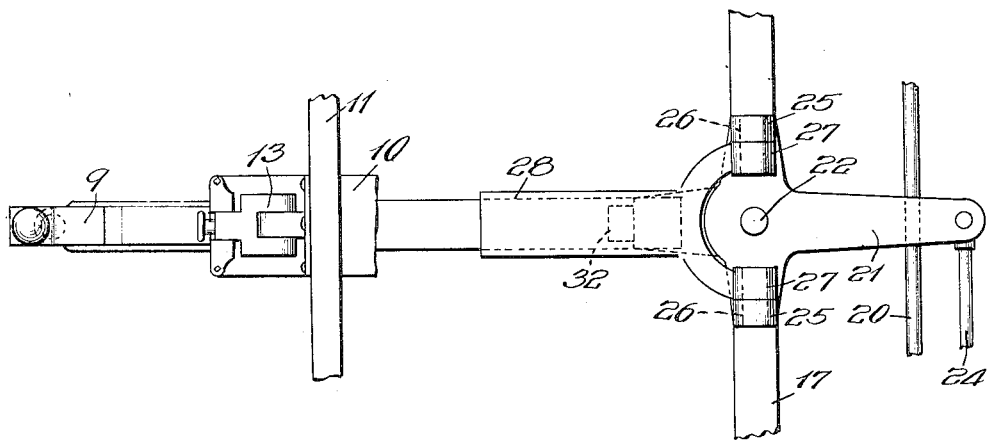
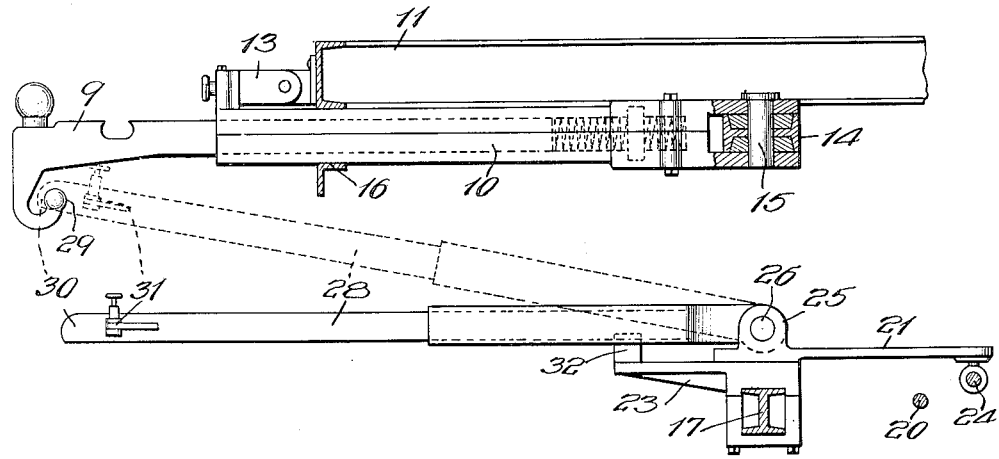

1,511,263

UNITED STATES PATENT OFFICE.

ADDI BENJAMIN CADMAN, OF BELOIT, WISCONSIN, ASSIGNOR TO WARNER MANUFACTURING COMPANY, OF BELOIT, WISCONSIN, A CORPORATION OF WISCONSIN.

TRAILER TRUCK.

Application filed April 7, 1920, Serial No. 371,843. Renewed March 10, 1924.

*To all whom it may concern:*

Be it known that I, ADDI BENJAMIN CADMAN, a citizen of the United States, residing at Beloit, in the county of Rock and State of Wisconsin, have invented certain new and useful Improvements in Trailer Trucks, of which the following is a specification.

This invention relates to steering mechanism for a four-wheel trailer truck of the reversible type, that is to say, wherein the truck may be drawn and steered from either end, the front pair of wheels being attached to the draw bar to be steered thereby while the rear pair of wheels is locked in position parallel to the body frame of the truck.

In moving a trailer truck of this character into and out of positions to load and unload the same, it is frequently necessary to back up the trailer and the drawing unit (usually a motor truck), and it may often be necessary to back from the street into an alley running at right angles thereto or even to back the motor truck and trailer through a sinuous path in order to get around other trucks, railroad cars, loading platforms, or other obstacles.

In order to obtain the maximum flexibility and to facilitate the operation under condition such as described, it is desirable that the steering device which connects the draw bar to the wheels be capable of being disconnected so that the wheels may, at times, be locked in position parallel to the body frame or perpendicular to the axle, and may, at other times, be connected to the draw bar to be steered thereby, and may, at still other times, be disconnected altogether so as to allow the wheels to be manually swung by the operator.

To facilitate an understanding of the purposes of such a construction it may be said that when the trailer is being drawn forwardly the front wheels are connected to the draw bar to be steered thereby while the rear wheels are locked in position parallel to the body frame. When the trailer is being backed, the front wheels, i. e., the wheels near the motor truck, are detached from the draw bar and locked in position parallel to the body frame so that they will run in a straight line, leaving the draw bar which is attached to the motor truck free to swing through its full arc without affecting these wheels. At the same time the rear pair of wheels (now the leading wheels in backing) are unlocked from their position parallel to the body frame so that they may be manually steered by the operator to lead the trailer and motor truck in the desired path.

It may frequently be necessary to stop backing and pull ahead a short distance to re-position the truck and trailer for further backing. When this is to be done, the rear wheels are again locked in position parallel to the body frame and the front wheels are unlocked from such parallel position and are connected to the draw bar so as to be steered by the latter in pulling ahead.

It will be apparent that at the end of the previous backing operation the front draw bar will frequently lie in angular position relative to the center line of the trailer so that it is impossible to connect the wheels to the draw bar without shifting the wheels around into alinement with the draw bar. It is an object of my invention to produce an improved construction which permits of unlocking the wheels from their position parallel to the body frame and manually swinging them into position parallel to the draw bar so that they may be connected to the latter preparatory to pulling ahead; also the reverse of this operation, that is to say, disconnecting the wheels from the draw bar and swinging them into position parallel to the body frame to be locked in such position preparatory to another backing up operation.

Another object of the invention is to provide an improved steering gear of simple and durable construction having a minimum number of joints adapted to accommodate itself to all of the conditions hereinbefore mentioned and many other conditions encountered in practical use so as to facilitate to the maximum degree the moving of a trailer and its tractor into and out of difficult positions.

Another object of the invention is to provide a steering gear adapted for use in a trailer wherein the draw bar is mounted on the body frame and said frame is supported upon the axles by springs and to arrange the steering gear so that the relative approaching and receding movements between the body frame and the axles will not affect the steering gear or change the positions or angularity of the wheels in any way.

A further object is to provide a trailer truck of the type just outlined in which the steering gear is mainly mounted on the axle and comprises a portion which extends upward for the connection to the draw bar; and in which the steering gear or a portion thereof may be detachably locked directly to the axle, so that the wheels may be held in position parallel to the body frame or may be allowed to be swung, as may be desired, either by the draw bar or manually by the operator independently of the draw bar.

Another object of the invention is to provide an improved steering gear in which the inclined steering lever is connected to the draw bar at the extreme forward end of the latter beyond the end of the body frame, whereby the steering lever may be conveniently attached to and detached from the draw bar and will provide a long leverage for manually turning the wheels, and whereby the connection will be as direct as possible from the coupling-head on the inner draw bar section to the wheels so as to eliminate any effect on the steering which might be caused by looseness or play between the sections of the draw bar or in the mounting of the latter on its king pin.

In the accompanying drawings Fig. 1 is a sectional elevation illustrating one end of a trailer truck embodying my invention.

Fig. 2 is a plan view showing somewhat diagrammatically a trailer truck connected with the rear portion of a motor truck or other tractor, and illustrating one position of the parts in the operation of backing the trailer, the wheels adjacent to the motor truck being locked parallel to the body frame leaving the draw bar free to swing independently, while the rear wheels are left free to be swung manually by the operator in steering the trailer.

Figs. 3 and 4 are enlarged fragmentary detail views, in plan and sectional elevation respectively, showing the parts of the steering gear and wheel locking means.

In the exemplary embodiment of the invention which is shown in the drawings, the trailer, aside from the steering gear, is of substantially the same construction as that shown in my prior Patent No. 1,245,676, issued November 6, 1917, to which reference may be had for general information as to the structure of this type of trailer.

Referring to Fig. 2 of the accompanying drawings, the reference numeral 7 designates a drawing unit or tractor which is connected by means of a link 8 with a coupling head 9 on the sectional draw bar 10 of a trailer truck which is constructed in accordance with my present invention. The body frame of the trailer is indicated by numeral 11 and the wheels by 12. The draw bar may comprise an outer section or housing pivoted at its rear end to a cross piece 14 forming part of the body frame by means of a king pin 15, the forward end of the housing projecting through a slot or guideway formed between the end of the frame 11 and a supporting bar or rest 16 attached thereto. The other section of the drawbar slides longitudinally within this housing and carries the coupler head 9 at its forward end. Means designated 13 are provided for locking the drawbar housing in central position on the body frame in a manner fully disclosed in my said patent.

The axles are designated 17 and the springs which support the body frame from the axles are indicated at 18. The wheels 12 are mounted upon stub axles which are pivoted on the ends of the main axle 17 and are provided with steering knuckles or arms 19.

The means for connecting the drawbar to the wheels for steering the latter, for locking the wheels at right angles to the axle, and for permitting manipulation of the wheels by hand will now be described. The two steering arms 19 of each pair of wheels are directly connected together by a single tie rod 20 which maintains the wheels in parallelism at all times. A lever 21 is mounted for pivotal movement upon a vertical king pin 22 which is carried by a bracket 23 rigidly secured to the midportion of the axle 17. The lever 21 in the present instance is of T-shape, one arm of the lever extending at right angles to the axle 17 and being connected by a drag link 24 to an extension on one of the steering arms 19 of the wheels, suitable joints, such as ball and socket joints, being employed at the ends of said drag link. The other arms of the lever 21, which are in alinement with each other and overlie the axle, have bearings 25 at their ends to receive pivot pins 26 which pins also extends into bearings 27 on the forked end of a steering lever 28. The pins 26 may be fixed in either pair of bearings 25 or 27, being rotatable in the other bearings so as to permit of a swinging movement of the lever 28 up and down on said pins as an axis. The lever 28 is composed of two telescoping sections and at the forward end thereof the lever carries one element of a detachable coupling or locking device, the other element of which is mounted on the extreme forward end of the drawbar. In the present instance I have shown the said locking device as comprising a ball 29 carried upon the lower end of a bracket or goose-neck member which depends from the forward end of the coupler head 9, said ball being arranged to be received by a socket 30 on the forward end of the lever 28 and to be held in said socket by suitable retaining means 31. The ball and socket connection may be of the character disclosed in my prior Patent No. 1,340,521, issued May 18, 1920, to which reference may be had for details.

When the lever 28 is detached from the drawbar it may be manipulated manually to position the wheels at the desired angle, and if desired it may be lowered into engagement with an upstanding device 32 on the bracket 23 on the axle so as to secure the lever against lateral swinging movement and thereby hold the wheels at right angles to the axle or parallel to the body frame. The device 32 may be in the form of a lug to enter the recess in the lever 28 or it may consist of two lugs between which the lever lies.

In the operation or use of the trailer, the rear wheels are normally locked at right angles to the axle through the steering lever 28 which is locked to the drawbar by the coupling device 29—30, the drawbar in turn being locked in its central position on the body frame by the locking device 13. The front wheels are left free to be swung by the drawbar while the trailer is traveling forwardly by disconnecting the locking device 13 leaving the drawbar free to swing laterally and carry with it the steering lever 28.

When it is desired to back up the trailer, the front wheels are locked at right angles to the axle by disconnecting the lever 28 from the drawbar and lowering said lever into engagement with the stop device 32 on the bracket 23. The front drawbar which is coupled to the motor truck is thus left free to swing laterally without affecting the wheels. The rear wheels (now the leading wheels in backing) may be unlocked by manipulating the locking device 13 to leave the drawbar 10 and lever 28 free to swing together, but preferably the lever 28 is disconnected from the drawbar by uncoupling the device 29—30, and the wheels are then manually steered by the operator by swinging the lever 28. Inasmuch as the said lever comprises telescoping parts, it may be extended to its maximum length, if desired, to increase the leverage on the wheels and facilitate steering them by hand.

It is sometimes necessary, after backing up, to pull ahead a short distance so as to straighten out the motor truck preparatory to further backing, and when this is to be done the rear wheels of the trailer are again locked at right angles to the axle while the front wheels are unlocked by raising the lever 28 out of engagement with the fixed stop 32 and securing said lever to the drawbar by the coupling device 29—30. It usually happens at the end of the backing up operation that the front drawbar which is attached to the motor truck extends at an angle to the longitudinal center line of the trailer so that when the lever 28 is raised vertically out of engagement with the locking device 32 on the axle it is not in the proper position to attach the coupling device 29—30. The lever and the wheels therefore must be swung laterally to position the lever directly beneath and in general alinement with the drawbar 10 in order to couple the device 29—30. This operation is very easily performed with the steering gear herein shown and the reverse of the operation is equally easy, that is to say, the detachment of the lever 28 from the drawbar when extending at an angle to the center line and the movement of the lever into position beneath the center line so as to engage with the device 32 for locking the wheels to the axle.

My construction allows for a variety of relationships of the various parts to facilitate the performance of their duty under the varying conditions of use. The wheels may be locked at right angles to the axle in two ways, to wit: by engaging the lever 28 with the stop device 32 on the axle or by coupling the said lever to the drawbar and locking the drawbar to the body frame by the device 13. The wheels may be manually steered when desired by unlocking the device 13 while the lever 28 is coupled to the drawbar and swinging the drawbar to turn the wheels, but this manual steering is preferably accomplished by detaching the lever 28 from the drawbar and swinging the wheels directly by said lever.

It will be seen that the steering gear herein disclosed is of very simple and durable construction, comprising a minimum number of parts and therefore a minimum number of joints at which looseness or play can occur. By reason of the fact that the steering lever 28 extends to the extreme end of the drawbar, the lever may be conveniently coupled to and uncoupled from the drawbar, whereupon the lever is in convenient position to be manually swung, and on account of its length affords good leverage for the purpose of shifting the wheels. Furthermore, the lever provides a direct connection between the steering element on the axle and the element (the coupler-head 9) to which the pulling and steering power is first applied, so that any play or lost motion between the sections of the drawbar, or at the king-pin mounting thereof, will not affect the accuracy of the steering.

In some of the trailers of the prior art, by reason of the construction of the steering gear employed therein, any relative approaching or receding movement between the body frame and the axle would act to swing the wheels. This is an effect which is very objectionable, and which is entirely eliminated by my construction. The said approaching and receding movement is taken care of by relative motion between the telescoping parts of the steering lever 28, without in any way affecting the position of the steering means as a whole or the wheels, and the telescoping lever 28 also accommodates the relative sliding movements of the inner drawbar section with relation to the outer section, such movements being allowed for by cushioning springs (not herein shown) within the outer section. In all of these relative movements of the parts the steering means receives its motion directly from the coupler-head 9.

While I have shown a preferred embodiment of my invention in the drawings and have described the same in considerable detail, I recognize that many modifications may be made without departing from the spirit and scope of the invention and therefore do not intend to limit the invention to the construction disclosed except as specified in the appended claims.

I claim as my invention:

1. In a trailer truck having a draw bar pivoted on the body frame and carrying a coupler head, and having a wheel steering lever pivoted on the axle, means for detachably locking said steering lever to said draw bar comprising an element depending from said coupler head and extending rearwardly, an upstanding ball mounted on said element, and a downwardly opening socket member on said steering lever arranged to receive said ball in detachable engagement.

2. A trailer truck having, in combination, a body frame, an axle supporting said frame and having swivelled wheels thereon, a draw bar pivotally mounted on said frame, a coupler head carried by said draw bar, a gooseneck member depending from said coupler head and extending rearwardly with its end upturned, an upstanding ball on the end of said member, a pivoted lever mounted on said axle and having steering connection with said wheels, a socket portion on the end of said lever adapted to be readily engaged or disengaged with said ball, and means associated with said socket portion for retaining said ball therein when so engaged.

3. A trailer truck having, in combination, a draw bar comprising two sections, one of which is pivoted to the trailer and the other of which is arranged to slide longitudinally with relation to the first mentioned section, a steering lever comprising two relatively slidable sections one of which is pivoted to the trailer and having connections for turning the wheels, and means for detachably connecting the other section of said steering lever to the second mentioned section of said draw bar, said means including a ball mounted on said draw bar adapted to engage a socket in said steering lever, said ball and socket being constructed to be readily associated and disassociated.

In testimony whereof, I have hereunto set my hand.

ADDI BENJAMIN CADMAN.